US009444872B2

United States Patent
Zhao et al.

(10) Patent No.: US 9,444,872 B2
(45) Date of Patent: Sep. 13, 2016

(54) METHOD, SERVER AND SYSTEM FOR DATA SHARING

(71) Applicant: TENCENT TECHNOLOGY (SHENZHEN) COMPANY LIMITED, Shenzhen, Guangdong (CN)

(72) Inventors: Yipeng Zhao, Shenzhen (CN); Xiaocong Huang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 429 days.

(21) Appl. No.: 14/103,291

(22) Filed: Dec. 11, 2013

(65) Prior Publication Data

US 2014/0172982 A1 Jun. 19, 2014

Related U.S. Application Data

(63) Continuation of application No. PCT/CN2013/085032, filed on Oct. 11, 2013.

(30) Foreign Application Priority Data

Dec. 14, 2012 (CN) .......................... 2012 1 0543531

(51) Int. Cl.
*G06F 15/16* (2006.01)
*H04L 29/08* (2006.01)
(Continued)

(52) U.S. Cl.
CPC ............ *H04L 67/02* (2013.01); *G06F 17/3089* (2013.01); *H04L 9/00* (2013.01); *H04L 9/006* (2013.01)

(58) Field of Classification Search
CPC .................... H04L 12/1813–12/1831; H04L 29/06414–29/06435; H04L 65/4015; H04L 9/00; H04L 9/06; H04L 67/00–67/02
See application file for complete search history.

(56) References Cited

U.S. PATENT DOCUMENTS

| 6,438,597 B1 * | 8/2002 | Mosberger .............. H04L 69/16 709/227 |
| 2009/0037517 A1 * | 2/2009 | Frei ................... G06F 17/30893 709/202 |

(Continued)

FOREIGN PATENT DOCUMENTS

| CN | 1638338 A | 7/2005 |
| CN | 101262494 A | 9/2008 |

(Continued)

OTHER PUBLICATIONS

State Intellectual Property Office of the P.R. China (ISR/CN), "International Search Report for PCT/CN2013/085032", China, Jan. 16, 2014.

(Continued)

*Primary Examiner* — Brendan Higa
(74) *Attorney, Agent, or Firm* — Tim Tingkang Xia, Esq.; Locke Lord LLP

(57) ABSTRACT

Embodiments of the present invention provide method, server and system for data sharing, and non-transitory computer-readable medium storing instructions which, when executed by one or more processors, cause the system to perform the method for data sharing. The method includes establishing, according to a first webpage request of a first terminal, a long connection of communications with the first terminal; establishing, according to a second webpage request of a second terminal, long connection of communications with the second terminal, where the first and second webpage requests carry respectively first and second webpage identities; determining, according to the first and second webpage identities, whether the first and second terminals are shared terminals; and if the first and second terminals are the shared terminals, sharing data of the first terminal to the second terminal, and sharing data of the second terminal to the first terminal.

13 Claims, 9 Drawing Sheets

(51) Int. Cl.
  *H04L 9/00* (2006.01)
  *G06F 17/30* (2006.01)

(56) References Cited

U.S. PATENT DOCUMENTS

| | | | | |
|---|---|---|---|---|
| 2011/0283203 | A1* | 11/2011 | Periyannan | H04N 7/141 715/753 |
| 2012/0082226 | A1* | 4/2012 | Weber | H04N 7/141 375/240.12 |
| 2012/0265892 | A1* | 10/2012 | Ma | H04N 21/23418 709/231 |
| 2014/0089662 | A1* | 3/2014 | Huang | G06F 21/6209 713/165 |
| 2014/0201848 | A1* | 7/2014 | Kulkarni | G06F 21/6218 726/27 |
| 2014/0289831 | A1* | 9/2014 | Prakash | H04L 9/3228 726/7 |

FOREIGN PATENT DOCUMENTS

| | | |
|---|---|---|
| CN | 101296201 A | 10/2008 |
| CN | 101771532 A | 7/2010 |
| CN | 101933013 A | 12/2010 |
| CN | 102185875 A | 9/2011 |
| CN | 102362478 A | 2/2012 |
| CN | 102483792 A | 5/2012 |
| CN | 102664926 A | 9/2012 |
| CN | 102761564 A | 10/2012 |
| CN | 103024043 A | 4/2013 |
| EP | 1517252 A1 | 3/2005 |
| WO | 2012/089510 A1 | 7/2012 |

OTHER PUBLICATIONS

State Intellectual Property Office of the P.R. China, "First Office Action and Search Report for CN Application No. 2012105435316", China, Oct. 28, 2014.

State Intellectual Property Office of the P.R. China, "Second Office Action and Search Report for CN Application No. 2012105435316", China, Jun. 2, 2015.

State Intellectual Property Office of the P.R. China, "Third Office Action for CN Application No. 2012105435316", China, Jul. 28, 2015.

* cited by examiner

METHOD, SERVER AND SYSTEM FOR DATA SHARING

CROSS-REFERENCE TO RELATED APPLICATIONS

This application is a continuation application of International Patent Application No. PCT/CN2013/085032, filed Oct. 11, 2013, which itself claims the priority to Chinese Patent Application No. 201210543531.6, filed Dec. 14, 2012 in the State Intellectual Property Office of P.R. China, which are hereby incorporated herein in their entireties by reference.

FIELD OF THE INVENTION

The present invention relates generally to data sharing, and more particularly to a method, a server and a system for data sharing, and a non-transitory computer-readable medium storing instructions which, when executed by one or more processors, cause the system to perform the method for data sharing.

BACKGROUND OF THE INVENTION

With the development of the Internet, it is gradually a developing trend to use the Internet to implement data sharing between terminals. The existing mainstream technologies for implementing data sharing between terminals have the following two categories. One is: implementing data sharing through wired connection. For example, a mobile phone terminal is connected with a personal computer (PC) terminal through a data line, so that data is transmitted between the mobile phone terminal and the PC terminal. This technical solution is limited to the connection mode, and data sharing cannot be implemented without a connection line. If wired interfaces between the terminals do not match, normal wired connection cannot be established, and data sharing between the terminals cannot be implemented. The other one is: installing an application for data transmission in a terminal requiring data sharing, and implementing data sharing by using the application. For example, two-dimensional code generation software is installed at the PC terminal to generate a two-dimensional code picture containing shared data; and meanwhile, two-dimensional code scanning software is installed at the mobile phone terminal, so that the software scans the two-dimensional code picture that contains the shared data and is presented at the PC terminal to obtain the shared data. This technical solution needs to install additional software in the terminals, and the data sharing process is rather complex and cumbersome, which affects the data sharing efficiency.

Therefore, a heretofore unaddressed need exists in the art to address the aforementioned deficiencies and inadequacies.

SUMMARY OF THE INVENTION

Embodiments of the present invention provide a method, a server and a system for data sharing, and a non-transitory computer-readable medium storing instructions which, when executed by one or more processors, cause the system to perform the method for data sharing, so as to rapidly implement data sharing between terminals through simple operations, simplify operations in a data sharing process, and improve data sharing efficiency.

In one aspect, the present invention relates to a method for data sharing, which includes:

establishing, according to a first webpage request of a first terminal, a long connection of communications with the first terminal, where the first webpage request carries a first webpage identity;

establishing, according to a second webpage request of a second terminal, a long connection of communications with the second terminal, where the second webpage request carries a second webpage identity;

determining, according to the first webpage identity and the second webpage identity, whether the first terminal and the second terminal are shared terminals; and if the first terminal and the second terminal are shared terminals, sharing data of the first terminal to the second terminal, and sharing data of the second terminal to the first terminal.

In another aspect, the present invention relates to a server for data sharing, which includes:

a connection establishing module, configured to establish, according to a first webpage request of a first terminal, a long connection of communications with the first terminal, and establish, according to a second webpage request of a second terminal, a long connection of communications with the second terminal, where the first webpage request carries a first webpage identity, and the second webpage request carries a second webpage identity;

a determining module, configured to determine, according to the first webpage identity and the second webpage identity, whether the first terminal and the second terminal are shared terminals; and a data sharing module, configured to, if the first terminal and the second terminal are shared terminals, share data of the first terminal to the second terminal, and share data of the second terminal to the first terminal.

In a yet another aspect, the present invention relates to a system for data sharing, which includes a first terminal, a second terminal and a server, where the server is the server disclosed above.

In a further aspect, the present invention, the present invention relates to a non-transitory computer-readable medium storing instructions which, when executed by one or more processors, cause the above system to perform the above method for data sharing The embodiments of the present invention can be implemented to achieve the following beneficial effects:

In the embodiments of the present invention, it can be automatically determined through matching whether terminals that establish a long connection of communications with a server are shared terminals, and data sharing is implemented between the terminals that are determined to be the shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

These and other aspects of the present invention will become apparent from the following description of the preferred embodiment taken in conjunction with the following drawings, although variations and modifications therein is affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
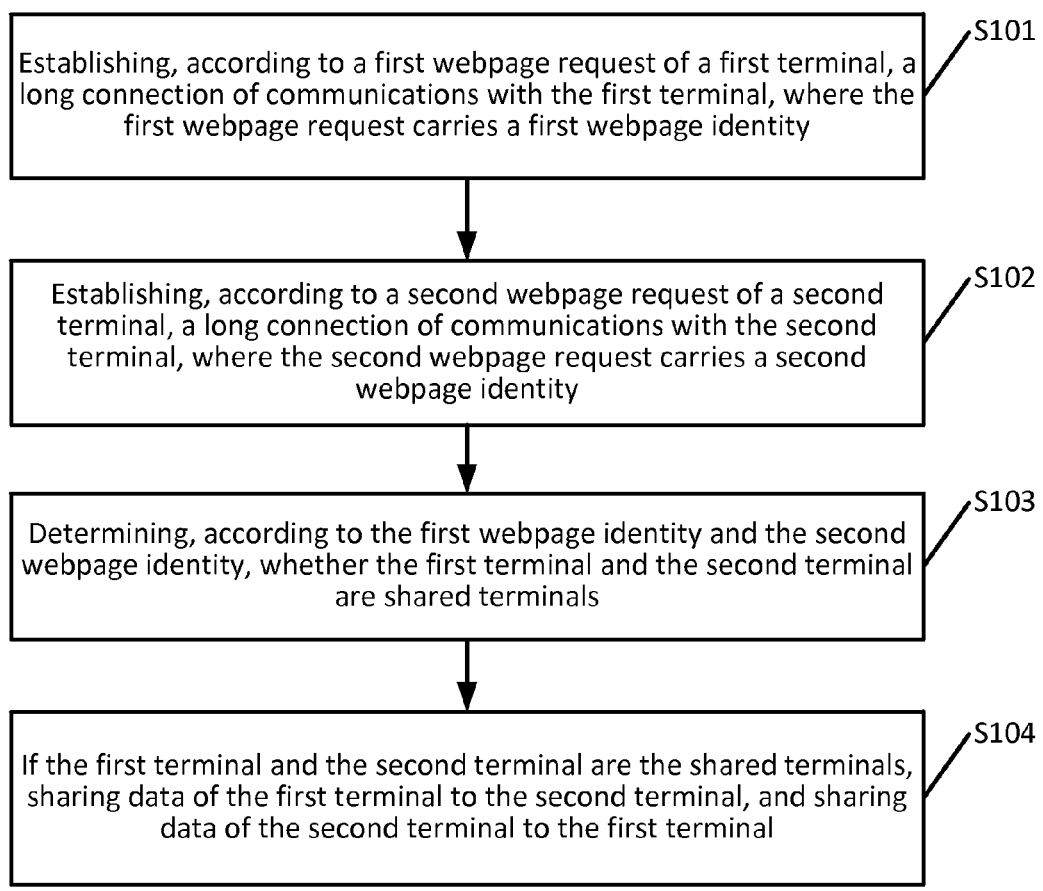
FIG. 1 is a flow chart of a method for data sharing according to one embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method is executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules is executed using a single (shared) processor. In addition, some or all code from multiple modules is stored by a single (shared) memory. The term "group", as used herein, means that some or all code from a single module is executed using a group of processors. In addition, some or all code from a single module is stored using a group of memories.

The systems and methods described herein are implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-9. It should be understood that specific embodiments described herein are merely intended to explain the present invention, but not intended to limit the present invention. In accordance with the purposes of this invention, as embodied and broadly described herein, this invention, in one aspect, relates to method and system for data sharing, and a non-transitory computer-readable medium storing instructions which, when executed by one or more processors, cause the system to perform the method for data sharing.

In embodiments of the present invention, a first terminal is any terminal in a data sharing system and includes, but not limited to, a PC, a tablet computer, a mobile phone, a smart phone, an e-reader, a notebook computer or any other terminal devices. The second terminal is any one or more terminals in the data sharing system except the first terminal, and may be any one or more of a PC, a tablet computer, a mobile phone, a smart phone, an e-reader, a notebook computer and other terminal apparatuses.

As used in the embodiments of the present invention, the term "long connection of communications" refers to a communication connection technology between a server and a terminal. After the long connection of communications is established, the server and the terminal keep communication at any time, and a communication connection does not need to be established again. The long connection of communications belongs to bi-directional connection, the terminal may send data to the server through the long connection of communications, and the server may also send data to the terminal through the long connection of communications.

Referring to FIG. 1 to FIG. 5, flowcharts of the method for data sharing are shown according the embodiments of the present invention.

FIG. 1 is a flow chart of a method for data sharing according to one embodiment of the present invention. In the embodiment, the method includes Step S101 to Step S104.

Step S101: Establish, according to a first webpage request of a first terminal, a long connection of communications with the first terminal, where the first webpage request carries a first webpage identity.

The first webpage identity is used for identifying a webpage requested by the first webpage request. The first terminal may initiate the first webpage request to the server through a browser in the first terminal. For example, a user inputs a first webpage identity in the browser of the first terminal, the first terminal initiates a first webpage request to the server; the server returns a webpage identified by the first webpage identity to the first terminal, and the first terminal displays the webpage in the browser thereof. Meanwhile, the first terminal may load a long connection program in the webpage, and through the long connection program, the server may establish long connection of communications with the first terminal.

Step S102: Establish, according to a second webpage request of a second terminal, a long connection of communications with the second terminal, where the second webpage request carries a second webpage identity.

The second webpage identity is used for identifying a webpage requested by the second webpage request. The second terminal may initiate the second webpage request to the server through a browser in the second terminal. For example, a user inputs a second webpage identity in the browser of the second terminal, the second terminal initiates a second webpage request to the server; the server returns a webpage identified by the second webpage identity to the second terminal, and the second terminal displays the webpage in the browser thereof. Meanwhile, the second terminal may load a long connection program in the webpage, and through the long connection program, the server may establish long connection of communications with the second terminal.

Step S103: Determine, according to the first webpage identity and the second webpage identity, whether the first terminal and the second terminal are shared terminals.

Since the first terminal and the second terminal both establish the long connection of communications with the server, if the first terminal and the second terminal are the shared terminals, data sharing may be implemented between the first terminal and the second terminal based on the long connection of communications established between the server and the first terminal as well as the second terminal. In the embodiment of the present invention, the first webpage identity and the second webpage identity can not only be used as ordinary webpage identities for requesting webpages identified thereby from the server, but also serve as a condition for determining whether the first terminal and the second terminal are shared terminals. Therefore, to differentiate the webpage identities in the present invention with the ordinary webpage identities, in the embodiment of the present invention, the first webpage identity and the second webpage identity also need to satisfy a condition, that is, the first webpage identity contains an encrypted field, and the second webpage identity contains an encrypted field; or, the first webpage identity is an encrypted identity, and the second webpage identity is an encrypted identity.

Step S104: If the first terminal and the second terminal are the shared terminals, share data of the first terminal to the second terminal, and share data of the second terminal to the first terminal.

The shared data may be data of the webpages identified by the first webpage identity and the second webpage identity, and may also be operation instruction data for the webpages identified by the first webpage identity and the second webpage identity. Through data sharing implemented between the first terminal and the second terminal, the data and operation in the first terminal may be reflected to the second terminal, and the data and operation in the second terminal may be reflected to the first terminal.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

Figure 2:
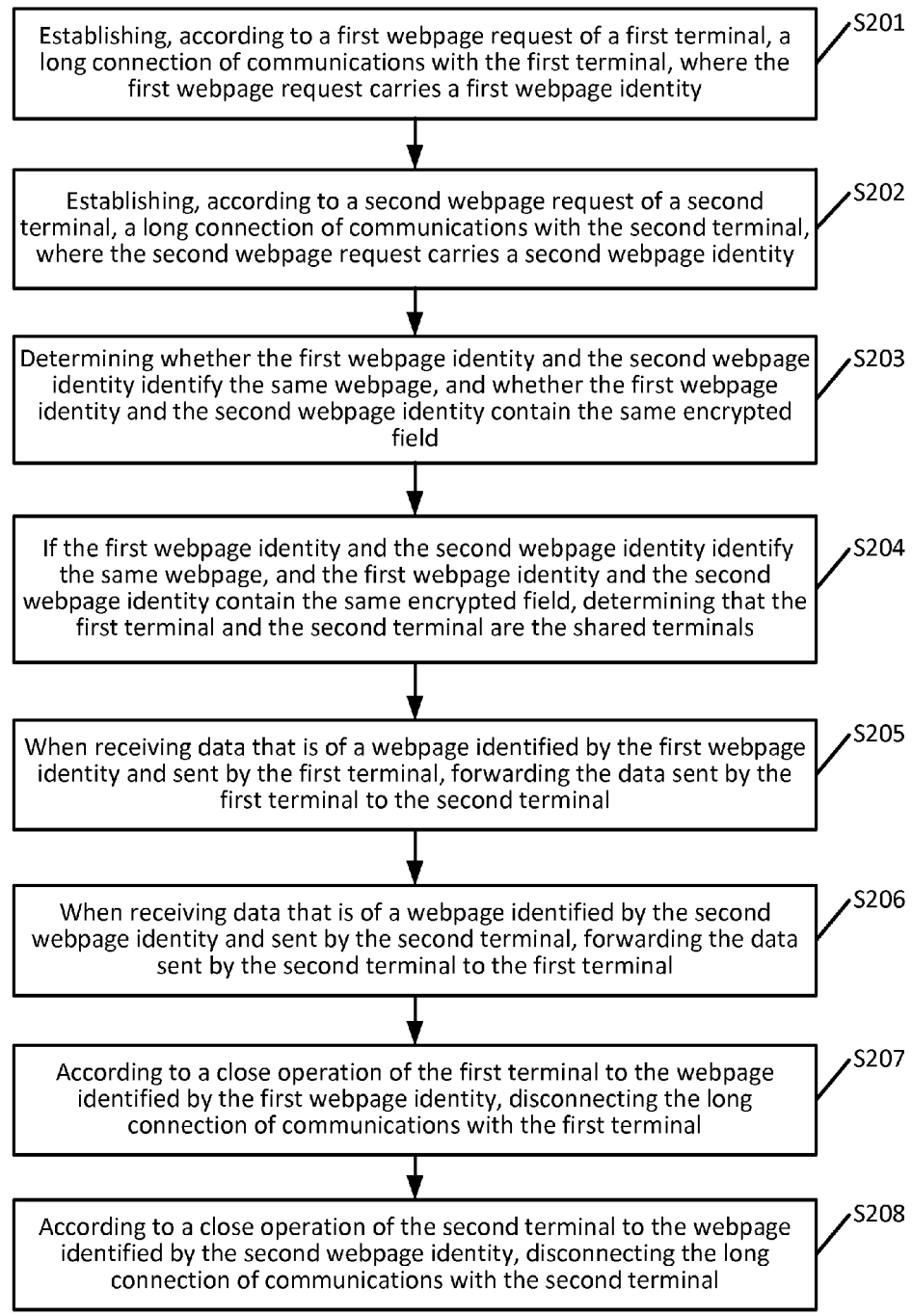
FIG. 2 is a flow chart of a method for data sharing according to another embodiment of the present invention.

FIG. 2 is a flow chart of a method for data sharing according to another embodiment of the present invention. In this exemplary embodiment, the method includes Step S201 to Step S208.

Step S201: Establish, according to a first webpage request of a first terminal, a long connection of communications with the first terminal, where the first webpage request carries a first webpage identity.

Step S202: Establish, according to a second webpage request of a second terminal, a long connection of communications with the second terminal, where the second webpage request carries a second webpage identity.

In this embodiment, for details of Step S201 to Step S202, reference can be made to Step S101 to Step S102 in FIG. 1, which will not be repeated herein.

Step S203: Determine whether the first webpage identity and the second webpage identity identify the same webpage, and whether the first webpage identity and the second webpage identity contain the same encrypted field.

In this embodiment, the first webpage identity contains an encrypted field, for example, the first webpage identity is http://weiiboo_xxx.com, where "http://weiiboo.com" is a uniform/universal resource locator (URL) address of a webpage identified by the first webpage identity, and the "xxx" field is the encrypted field of the first webpage identity and this field may be composed of any character string. The second webpage identity contains an encrypted field, for example, the second webpage identity is http://weiiboo_XXX.com, where "http://weiiboo.com" is a URL address of a webpage identified by the second webpage identity, and the "XXX" field is the encrypted field of the second webpage identity and this field may be composed of any character string.

Step S204: If the first webpage identity and the second webpage identity identify the same webpage, and the first webpage identity and the second webpage identity contain the same encrypted field, determine that the first terminal and the second terminal are shared terminals.

In Step S203 to Step S204, it is first determined whether the URL addresses contained in the first webpage identity and the second webpage identity are the same, if yes, it indicates that the first webpage identity and the second webpage identity identify the same webpage; and it is further determined whether the encrypted fields contained in the first webpage identity and the second webpage identity are the same, namely, according to the foregoing example, it is determined whether the "xxx" field contained in the first webpage identity is the same as the "XXX" field contained in the second webpage identity, and if yes, it indicates that the first terminal and the second terminal are shared terminals. On the contrary, if the URL addresses contained in the first webpage identity and the second webpage identity are different, or, the encrypted fields contained in the first webpage identity and the second webpage identity are different, it indicates that the first terminal and the second terminal are not shared terminals.

Step S205: When receiving data that is of a webpage identified by the first webpage identity and sent by the first terminal, forward the data sent by the first terminal to the second terminal.

Through the long connection of communications established between the first terminal and the server, the server may forward, to the second terminal, data that is of a webpage identified by the first webpage identity and sent by the first terminal, so as to share the webpage data in the first terminal between the first terminal and the second terminal. The webpage data in the first terminal includes, but is not limited to, picture data, text data, and audio and video data in the webpage identified by the first webpage identity. For example, if the first terminal is a mobile phone terminal and the second terminal is a PC terminal, in this step, the webpage data sent by the mobile phone terminal is shared with the PC terminal, so that a user can easily view the webpage data through the large-screen advantage of the PC terminal.

Step S206: When receiving data that is of a webpage identified by the second webpage identity and sent by the second terminal, forward the data sent by the second terminal to the first terminal.

Through the long connection of communications established between the second terminal and the server, the server may forward, to the first terminal, data that is of a webpage identified by the second webpage identity and sent by the second terminal, so as to share the webpage data in the second terminal between the first terminal and the second terminal. The webpage data in the second terminal includes, but is not limited to, picture data, text data, and audio and video data in the webpage identified by the second webpage identity.

Step S207: According to a close operation of the first terminal to the webpage identified by the first webpage identity, disconnect the long connection of communications with the first terminal.

When the first terminal performs a close operation on the webpage identified by the first webpage identity, for example, a user clicks a close button in the webpage that is identified by the first webpage identity and displayed by the browser of the first terminal, or the user turns off the browser of the first terminal, the first terminal performs a close operation on the webpage; and at this time, a long connection program in the webpage identified by the first webpage identity stops running, and the server disconnects the long connection of communications with the first terminal.

Step S208: According to a close operation of the second terminal to the webpage identified by the second webpage identity, disconnect the long connection of communications with the second terminal.

When the second terminal performs a close operation on the webpage identified by the second webpage identity, for example, a user clicks a close button in the webpage that is identified by the second webpage identity and displayed by the browser of the second terminal, or the user turns off the browser of the second terminal, the second terminal performs a close operation on the webpage; and at this time, a long connection program in the webpage identified by the second webpage identity stops running, and the server disconnects the long connection of communications with the second terminal. It should be noted that, after Step S207 to Step S208, if data sharing needs to be implemented between the first terminal and the second terminal, the webpage is required to be reopened in the first terminal and the second terminal, and a webpage request is initiated to the server, so that the server re-performs the foregoing steps to implement data sharing between the first terminal and the second terminal.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

Figure 3:
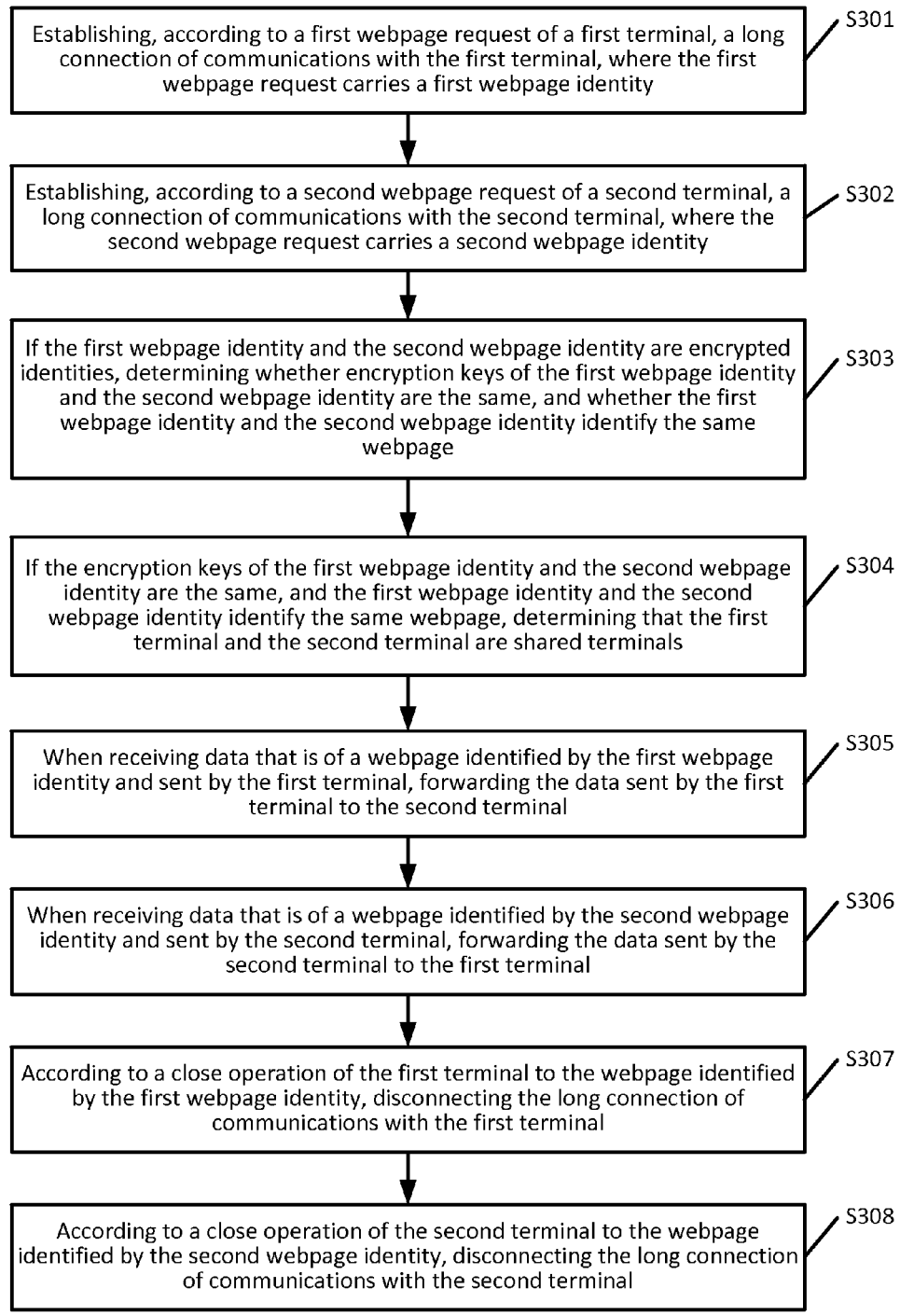
FIG. 3 is a flow chart of a method for data sharing according to yet another embodiment of the present invention.

FIG. 3 is a flow chart of a method for data sharing according to yet another embodiment of the present invention. In this embodiment, the method includes Step S301 to Step S308.

Step S301: Establish, according to a first webpage request of a first terminal, a long connection of communications with the first terminal, where the first webpage request carries a first webpage identity.

Step S302: Establish, according to a second webpage request of a second terminal, a long connection of communications with the second terminal, where the second webpage request carries a second webpage identity.

Step S303: If the first webpage identity and the second webpage identity are encrypted identities, determine whether encryption keys of the first webpage identity and the second webpage identity are the same, and whether the first webpage identity and the second webpage identity identify the same webpage.

In this embodiment, the first webpage identity is an encrypted identity, for example, the first webpage identity is "http://weiiboo.com", and Key1 is used for encryption, where "http://weiiboo.com" is a URL address of a webpage identified by the first webpage identity, and "Key1" is an encryption key of the first webpage identity and "Key1" can be obtained through various encryption algorithms which include, but are not limited to, hash algorithm and digest algorithm. The second webpage identity contains an encrypted field, for example, the second webpage identity is http://weiiboo.com, and Key2 is used for encryption, where "http://weiiboo.com" is a URL address of a webpage identified by the second webpage identity, and "Key2" is an encryption key of the second webpage identity and "Key2" can be obtained through various encryption algorithms which include, but are not limited to, hash algorithm and digest algorithm.

Step S304: If the encryption keys of the first webpage identity and the second webpage identity are the same, and the first webpage identity and the second webpage identity identify the same webpage, determine that the first terminal and the second terminal are shared terminals.

When returning the requested webpage to the first terminal in response to the first webpage request, the server decrypts the first webpage identity, and records the encryption key "Key1" of the first webpage identity; and when returning the requested webpage to the second terminal in response to the second webpage request, the server decrypts the second webpage identity, and records the encryption key "Key2" of the second webpage identity. In Step S303 to Step S304, the server first determines whether "Key1" is the same as "Key2", that is, whether "Key1" and "Key2" are the same encrypted value obtained by one encryption algorithm, if yes, the server further determines whether the URL addresses contained in the first webpage identity and the second webpage identity are the same, and if yes, it indicates that the first webpage identity and the second webpage identity identify the same webpage, and the first terminal and the second terminal are shared terminals. On the contrary, if the encryption keys of the first webpage identity and the second webpage identity are different, or, if the URL addresses contained in the first webpage identity and the second webpage identity are different, it indicates that the first terminal and the second terminal are not shared terminals.

Step S305: When receiving data that is of a webpage identified by the first webpage identity and sent by the first terminal, forward the data sent by the first terminal to the second terminal.

Step S306: When receiving data that is of a webpage identified by the second webpage identity and sent by the second terminal, forward the data sent by the second terminal to the first terminal.

Step S307: According to a close operation of the first terminal to the webpage identified by the first webpage identity, disconnect the long connection of communications with the first terminal.

Step S308: According to a close operation of the second terminal to the webpage identified by the second webpage identity, disconnect the long connection of communications with the second terminal.

In this embodiment, for details of Step S301 to Step S302, reference can be made to Step S201 to Step S202 in FIG. 2, and for details of Step S305 to Step S308, reference can be made to Step S205 to Step S208 in FIG. 2, which will not be repeated herein.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

Figure 4:
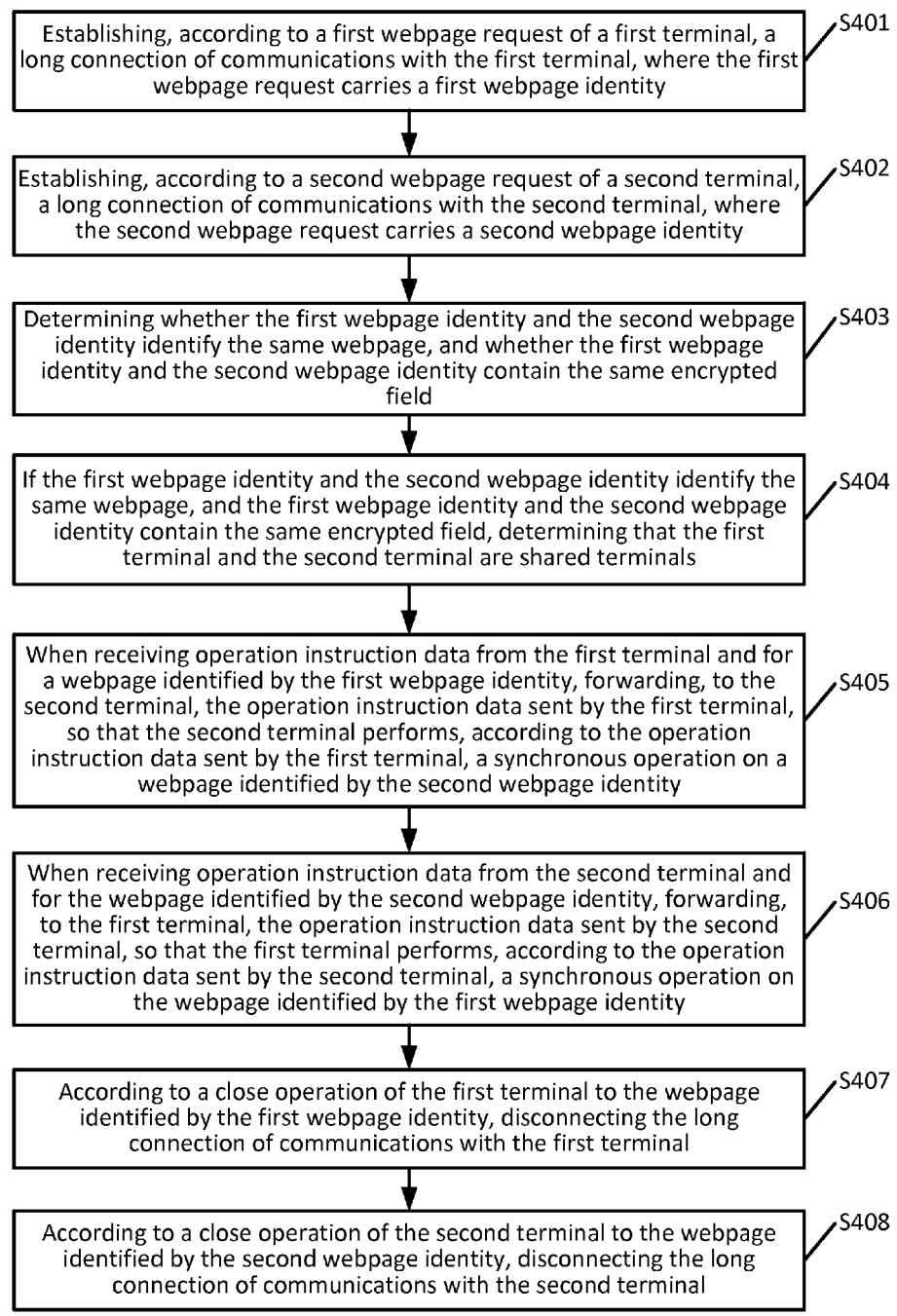
FIG. 4 is a flow chart of a method for data sharing according to one embodiment of the present invention.

FIG. 4 is a flow chart of a method for data sharing according to one embodiment of the present invention. Referring to FIG. 4, the method includes Step S401 to Step S408.

Step S401: Establish, according to a first webpage request of a first terminal, a long connection of communications with the first terminal, where the first webpage request carries a first webpage identity.

Step S402: Establish, according to a second webpage request of a second terminal, a long connection of communications with the second terminal, where the second webpage request carries a second webpage identity.

Step S403: Determine whether the first webpage identity and the second webpage identity identify the same webpage, and whether the first webpage identity and the second webpage identity contain the same encrypted field.

Step S404: If the first webpage identity and the second webpage identity identify the same webpage, and the first webpage identity and the second webpage identity contain the same encrypted field, determine that the first terminal and the second terminal are shared terminals.

Step S405: When receiving operation instruction data from the first terminal and for a webpage identified by the first webpage identity, forward, to the second terminal, the operation instruction data sent by the first terminal, so that the second terminal performs, according to the operation instruction data sent by the first terminal, a synchronous operation on a webpage identified by the second webpage identity.

The operation instruction data sent by the first terminal includes instruction data corresponding to operations such as add, delete, search and modify to the webpage identified by the first webpage identity. Through the long connection of communications established between the first terminal and the server, the server may forward, to the second terminal, the operation instruction data sent by the first terminal and for the webpage identified by the first webpage identity, so as to share the operation instruction data for the webpage in the first terminal between the first terminal and the second terminal, and the second terminal performs, according to the operation instruction data sent by the first terminal, a synchronous operation on the webpage identified by the second webpage identity. For example, if the first terminal is a PC terminal and the second terminal is a mobile phone terminal, when a user needs to search for certain content in a webpage displayed by the PC terminal, the server transmits instruction data of searching for the content to the mobile phone terminal, so that the user can search for the content in the webpage at any time when needed through the advantage of use convenience of the mobile phone terminal, which is not limited by the time and location and facilitates the operation of the user to the webpage.

Step S406: When receiving operation instruction data from the second terminal and for the webpage identified by the second webpage identity, forward, to the first terminal, the operation instruction data sent by the second terminal, so that the first terminal performs, according to the operation instruction data sent by the second terminal, a synchronous operation on the webpage identified by the first webpage identity.

The operation instruction data sent by the second terminal includes instruction data corresponding to operations such as add, delete, search and modify to the webpage identified by the second webpage identity. Through the long connection of communications established between the second terminal and the server, the server may forward, to the first terminal, the operation instruction data sent by the second terminal and for the webpage identified by the second webpage identity, so as to share the operation instruction data for the webpage in the second terminal between the first terminal and the second terminal, and the first terminal performs, according to the operation instruction data sent by the second terminal, a synchronous operation on the webpage identified by the first webpage identity.

Step S407: According to a close operation of the first terminal to the webpage identified by the first webpage identity, disconnect the long connection of communications with the first terminal.

Step S408: According to a close operation of the second terminal to the webpage identified by the second webpage identity, disconnect the long connection of communications with the second terminal.

In this embodiment, for details of Step S401 to Step S404, reference can be made to Step S201 to Step S204 in FIG. 2, and for details of Step S407 to Step S408, reference can be made to Step S207 to Step S208 in FIG. 2, which will not be repeated herein.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

Figure 5:
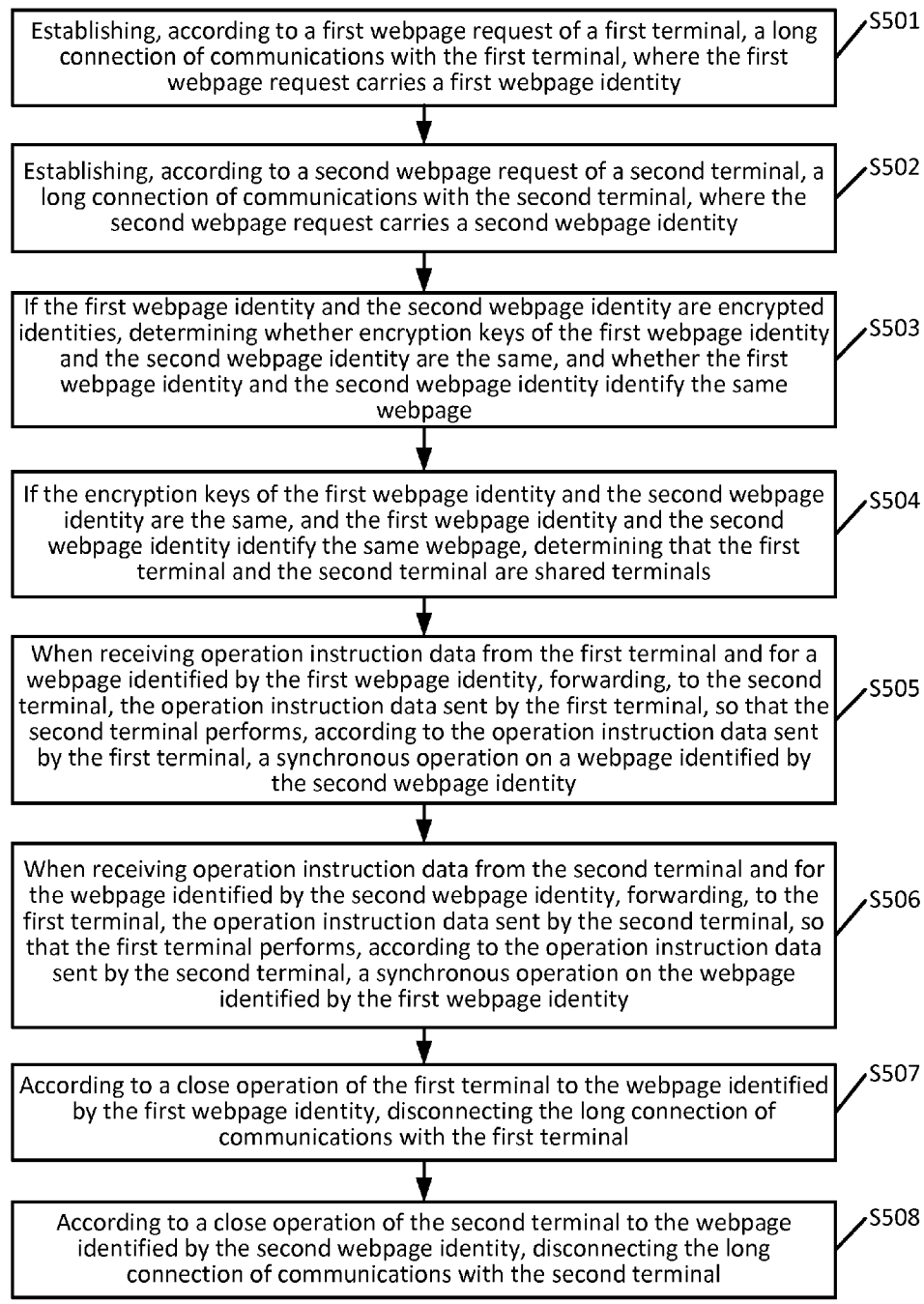
FIG. 5 is a flow chart of a method for data sharing according to another an embodiment of the present invention.

FIG. 5 is a flow chart of a method for data sharing according to another an embodiment of the present invention. Referring to FIG. 5, the method includes Step S501 to Step S508.

Step S501: Establish, according to a first webpage request of a first terminal, a long connection of communications with the first terminal, where the first webpage request carries a first webpage identity.

Step S502: Establish, according to a second webpage request of a second terminal, a long connection of communications with the second terminal, where the second webpage request carries a second webpage identity.

Step S503: If the first webpage identity and the second webpage identity are encrypted identities, determine whether encryption keys of the first webpage identity and the second webpage identity are the same, and whether the first webpage identity and the second webpage identity identify the same webpage.

Step S504: If the encryption keys of the first webpage identity and the second webpage identity are the same, and the first webpage identity and the second webpage identity identify the same webpage, determine that the first terminal and the second terminal are shared terminals.

Step S505: When receiving operation instruction data from the first terminal and for a webpage identified by the first webpage identity, forward, to the second terminal, the operation instruction data sent by the first terminal, so that the second terminal performs, according to the operation instruction data sent by the first terminal, a synchronous operation on a webpage identified by the second webpage identity.

Step S506: When receiving operation instruction data from the second terminal and for the webpage identified by the second webpage identity, forward, to the first terminal, the operation instruction data sent by the second terminal, so that the first terminal performs, according to the operation instruction data sent by the second terminal, a synchronous operation on the webpage identified by the first webpage identity.

Step S507: According to a close operation of the first terminal to the webpage identified by the first webpage identity, disconnect the long connection of communications with the first terminal.

Step S508: According to a close operation of the second terminal to the webpage identified by the second webpage identity, disconnect the long connection of communications with the second terminal.

In this embodiment, for details of Step S501 to Step S504, reference can be made to Step S301 to Step S304 in FIG. 3, for details of Step S505 to Step S506, reference can be made to Step S405 to Step S406 in FIG. 4, and for details of Step S507 to Step S508, reference can be made to Step S307 to Step S308 in FIG. 3, which will not be repeated herein.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

The structure of a server provided by an embodiment of the present invention is illustrated in details below with reference to FIG. 6 to FIG. 9. It should be noted that, the server can be applied to perform the method in each of the foregoing method embodiments.

Figure 6:
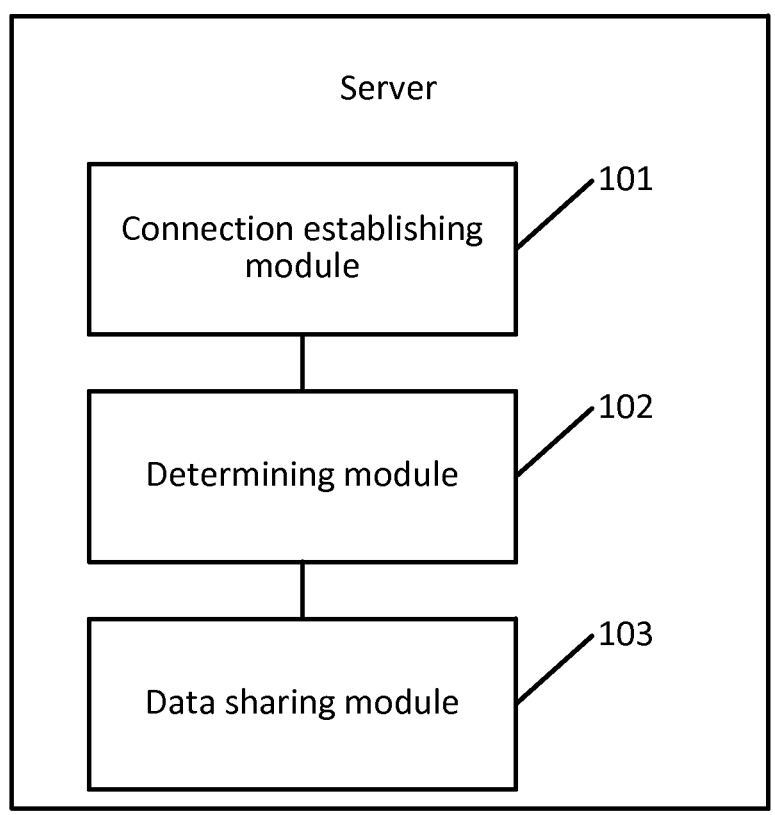
FIG. 6 is a schematic structural diagram of a server for data sharing according to one embodiment of the present invention.

FIG. 6 is a schematic structural diagram of a server for data sharing according to one embodiment of the present invention. In the exemplary embodiment, the server includes a connection establishing module 101, a determining module 102 and a data sharing module 103.

The connection establishing module 101 is configured to establish, according to a first webpage request of a first terminal, a long connection of communications with the first terminal, and establish, according to a second webpage request of a second terminal, a long connection of communications with the second terminal, where the first webpage request carries a first webpage identity, and the second webpage request carries a second webpage identity.

The first webpage identity is used for identifying a webpage requested by the first webpage request. The first terminal may initiate the first webpage request to the server through a browser in the first terminal. For example, a user inputs a first webpage identity in the browser of the first terminal, the first terminal initiates a first webpage request to the server; the server returns a webpage identified by the first webpage identity to the first terminal, and the first terminal displays the webpage in the browser thereof. Meanwhile, the first terminal may load a long connection program in the webpage, and through the long connection program, the connection establishing module 101 may establish long connection of communications with the first terminal. The connection establishing module 101 may establish long connection of communications with the second terminal in the same manner.

The determining module 102 is configured to determine, according to the first webpage identity and the second webpage identity, whether the first terminal and the second terminal are shared terminals.

The first webpage identity and the second webpage identity can not only be used as ordinary webpage identities for requesting webpages identified thereby from the server, but also serve as a condition for determining whether the first terminal and the second terminal are shared terminals. Therefore, to differentiate the webpage identities in the present invention with the ordinary webpage identities, in the embodiment of the present invention, the first webpage identity and the second webpage identity also need to satisfy a condition, that is, the first webpage identity contains an encrypted field, and the second webpage identity contains an encrypted field; or, the first webpage identity is an encrypted identity, and the second webpage identity is an encrypted identity.

The data sharing module 103 is configured to, if the first terminal and the second terminal are shared terminals, share data of the first terminal to the second terminal, and share data of the second terminal to the first terminal.

The shared data may be data of the webpages identified by the first webpage identity and the second webpage identity, and may also be operation instruction data for the webpages identified by the first webpage identity and the second webpage identity. The data sharing module 103 reflects the data and operation in the first terminal to the second terminal, and reflects the data and operation in the second terminal to the first terminal.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

The modules in the server are illustrated in details below with reference to FIG. 7 to FIG. 8.

Figure 7A:
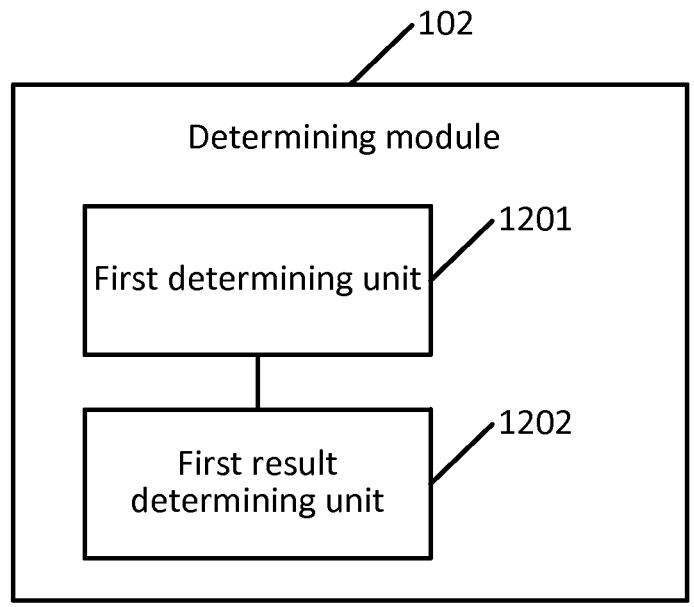
FIG. 7a is a schematic structural diagram of an embodiment of a determining module of the server shown in FIG. 6.

FIG. 7a is a schematic structural diagram of an embodiment of a determining module of the server shown in FIG. 6. Referring to FIG. 7a, the determining module 102 includes a first determining unit 1201 and a first result determining unit 1202.

The first determining unit 1201 is configured to determine whether the first webpage identity and the second webpage identity identify the same webpage, and whether the first webpage identity and the second webpage identity contain the same encrypted field.

The first result determining unit 1202 is configured to, if the first webpage identity and the second webpage identity identify the same webpage, and the first webpage identity and the second webpage identity contain the same encrypted field, determine that the first terminal and the second terminal are shared terminals.

It should be noted that, if the URL addresses contained in the first webpage identity and the second webpage identity are different, or, the encrypted fields contained in the first webpage identity and the second webpage identity are different, the first result determining unit 1202 determines that the first terminal and the second terminal are not shared terminals.

Figure 7B:
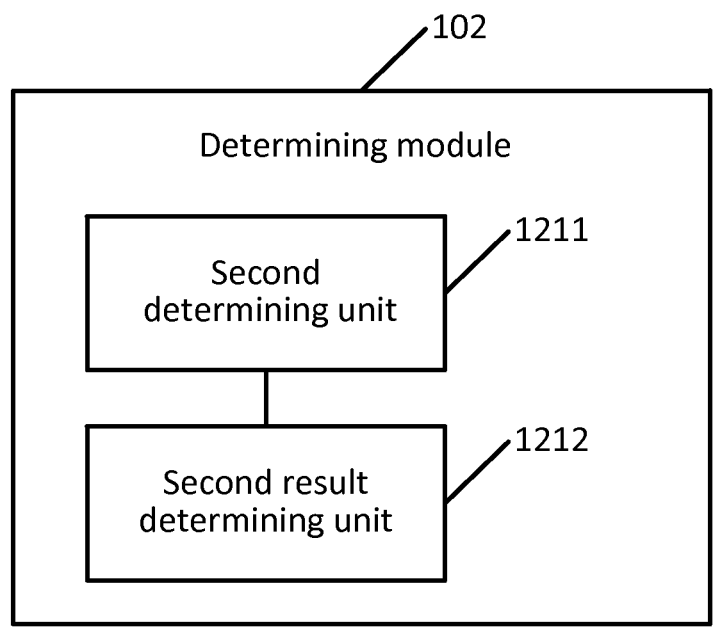
FIG. 7b is a schematic structural diagram of another embodiment of the determining module of the server shown in FIG. 6.

FIG. 7b is a schematic structural diagram of another embodiment of the determining module of the server shown in FIG. 6. Referring to FIG. 7b, the determining module 102 includes: a second determining unit 1211 and a second result determining unit 1212.

The second determining unit 1211 is configured to, if the first webpage identity and the second webpage identity are encrypted identities, determine whether encryption keys of the first webpage identity and the second webpage identity are the same, and whether the first webpage identity and the second webpage identity identify the same webpage.

The second result determining unit 1212 is configured to, if the encryption keys of the first webpage identity and the second webpage identity are the same, and the first webpage identity and the second webpage identity identify the same webpage, determine that the first terminal and the second terminal are shared terminals.

It should be noted that, if the encryption keys of the first webpage identity and the second webpage identity are different, or, if the URL addresses contained in the first webpage identity and the second webpage identity are different, that is, the webpages identified by the first webpage identity and the second webpage identity are different, the second result determining unit 1212 determines that the first terminal and the second terminal are not shared terminals.

Figure 8A:
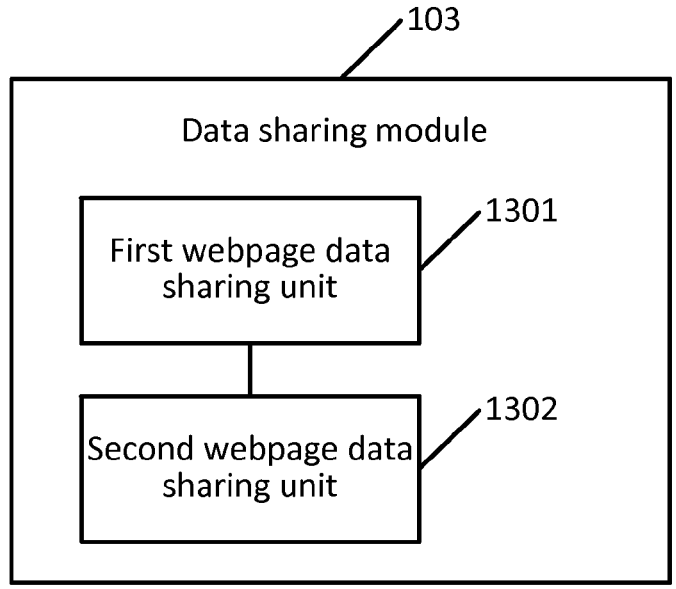
FIG. 8a is a schematic structural diagram of an embodiment of a data sharing module of the server shown in FIG. 6.

FIG. 8a is a schematic structural diagram of an embodiment of a data sharing module of the server shown in FIG. 6. Referring to FIG. 8a, the data sharing module 103 includes: a first webpage data sharing unit 1301 and a second webpage data sharing unit 1302.

The first webpage data sharing unit 1301 is configured to, when receiving data that is of a webpage identified by the first webpage identity and sent by the first terminal, forward the data sent by the first terminal to the second terminal.

The data sent by the first terminal includes, but is not limited to, picture data, text data, and audio and video data in the webpage identified by the first webpage identity.

The second webpage data sharing unit 1302 is configured to, when receiving data that is of a webpage identified by the second webpage identity and sent by the second terminal, forward the data sent by the second terminal to the first terminal.

The data sent by the second terminal includes, but is not limited to, picture data, text data, and audio and video data in the webpage identified by the second webpage identity.

Figure 8B:
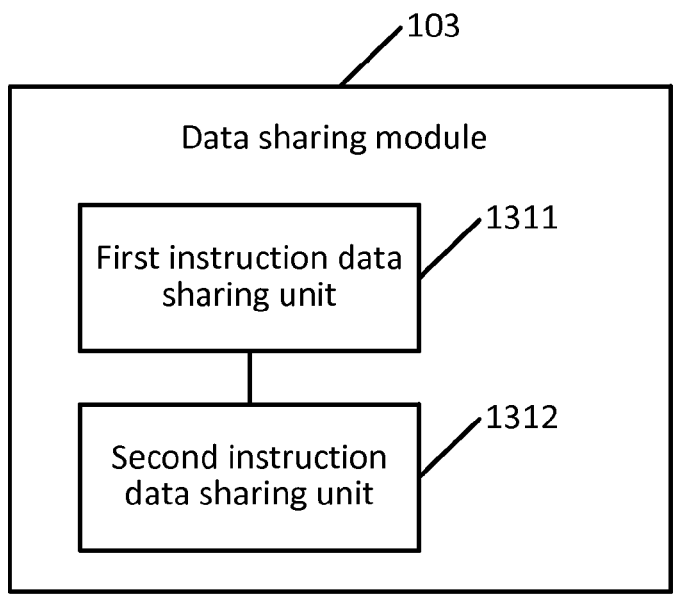
FIG. 8b is a schematic structural diagram of another embodiment of the data sharing module of the server shown in FIG. 6.

FIG. 8b is a schematic structural diagram of another embodiment of the data sharing module of the server shown in FIG. 6. Referring to FIG. 8b, the data sharing module 103 includes: a first instruction data sharing unit 1311 and a second instruction data sharing unit 1312.

The first instruction data sharing unit 1311 is configured to, when receiving operation instruction data from the first terminal and for a webpage identified by the first webpage identity, forward, to the second terminal, the operation instruction data sent by the first terminal, so that the second terminal performs, according to the operation instruction data sent by the first terminal, a synchronous operation on a webpage identified by the second webpage identity.

The operation instruction data sent by the first terminal includes instruction data corresponding to operations such as add, delete, search and modify to the webpage identified by the first webpage identity.

The second instruction data sharing unit 1312 is configured to, when receiving operation instruction data from the second terminal and for the webpage identified by the second webpage identity, forward, to the first terminal, the operation instruction data sent by the second terminal, so that the first terminal performs, according to the operation instruction data sent by the second terminal, a synchronous operation on the webpage identified by the first webpage identity.

The operation instruction data sent by the second terminal includes instruction data corresponding to operations such as add, delete, search and modify to the webpage identified by the second webpage identity.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

Figure 9:
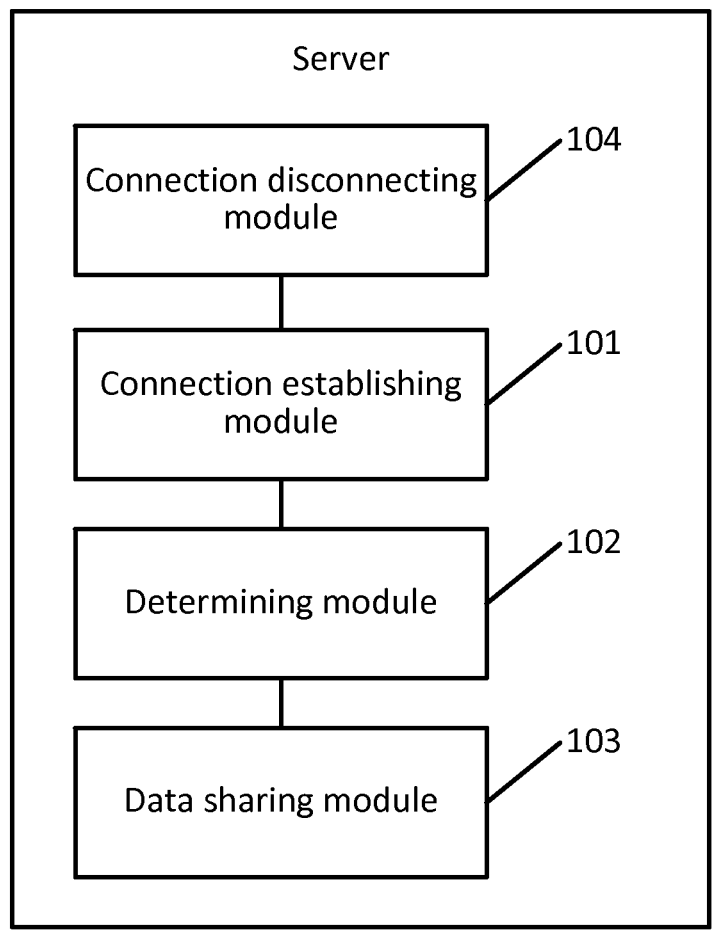
FIG. 9 is a schematic structural diagram of a server for data sharing according to another embodiment of the present invention.

FIG. 9 is a schematic structural diagram of a server for data sharing according to another embodiment of the present invention. In the embodiment, the server includes: the connection establishing module 101, the determining module 102, the data sharing module 103 and a connection disconnecting module 104. For the structures of the connection establishing module 101, the determining module 102 and the data sharing module 103, reference can be made to the related descriptions of the embodiments shown in FIG. 6 to FIG. 8, which will not be repeated herein.

The connection disconnecting module 104 is configured to, according to a close operation of the first terminal to the webpage identified by the first webpage identity, disconnect the long connection of communications with the first terminal; and according to a close operation of the second terminal to the webpage identified by the second webpage identity, disconnect the long connection of communications with the second terminal.

When the first terminal performs a close operation on the webpage identified by the first webpage identity, a long connection program in the webpage identified by the first webpage identity stops running, and the connection disconnecting module 104 disconnects the long connection of communications of the server with the first terminal. Similarly, when the second terminal performs a close operation on the webpage identified by the second webpage identity, a long connection program in the webpage identified by the second webpage identity stops running, and the connection disconnecting module 104 disconnects the long connection of communications of the server with the second terminal.

It should be noted that, the structure and function of the server provided by the embodiment of the present invention are specifically embodied through the method in each of the foregoing method embodiments, and for the specific implementation process, reference can be made to the related descriptions of the foregoing method embodiments, which will not be repeated herein.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

An embodiment of the present invention further provides a data sharing system, which includes a first terminal, a second terminal and a server. For details of the structure of the server, reference can be made to the related descriptions of the embodiments shown in FIG. 6 to FIG. 9, which will not be repeated herein. It should be noted that, the system of this embodiment is applicable to the foregoing method.

According to the embodiment of the present invention, it can be automatically determined through matching whether terminals that establish a long connection of communications with a server are shared terminals, and data sharing is implemented between the terminals that are determined to be shared terminals. Wired connection is not needed between the terminals, and additional software is not required to be installed in the terminals, so that terminal users can implement data sharing between the terminals by merely performing a simple operation of initiating a webpage request, which simplifies operations in a data sharing process and improves data sharing efficiency.

It should be noted that all or a part of the steps according to the embodiments of the present invention is implemented by hardware or a program instructing relevant hardware. Yet another aspect of the invention provides a non-transitory computer readable storage medium which stores computer executable instructions or program codes. The computer executable instructions or program codes enable a computer or a similar computing apparatus to complete various operations in the above disclosed method for data sharing. The storage medium includes, but not limited to, a magnetic disk, an optical disk, a read-only memory (ROM), a random access memory (RAM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for data sharing, comprising:
   establishing, according to a first webpage request of a first terminal, a long connection of communications with the first terminal, wherein the first webpage request carries a first webpage identity;
   establishing, according to a second webpage request of a second terminal, a long connection of communications with the second terminal, wherein the second webpage request carries a second webpage identity;
   determining, according to the first webpage identity and the second webpage identity, whether the first terminal and the second terminal are shared terminals; and if the first terminal and the second terminal are the shared terminals, sharing data of the first terminal to the second terminal, and sharing data of the second terminal to the first terminal, wherein the step of determining, according to the first webpage identity and the second webpage identity, whether the first terminal and the second terminal are the shared terminals comprises:

determining whether the first webpage identity and the second webpage identity identify a same webpage and whether the first webpage identity and the second webpage identity contain a same encrypted field, and if the first webpage identity and the second webpage identity identify the same webpage and the first webpage identity and the second webpage identity contain the same encrypted field, determining that the first terminal and the second terminal are the shared terminals; or if the first webpage identity and the second webpage identity are encrypted identities, determining whether encryption keys of the first webpage identity and the second webpage identity are the same and whether the first webpage identity and the second webpage identity identify a same webpage, and if the encryption keys of the first webpage identity and the second webpage identity are the same, and the first webpage identity and the second webpage identity identify the same webpage, determining that the first terminal and the second terminal are the shared terminals.

2. The method according to claim 1, wherein the step of sharing data of the first terminal to the second terminal, and sharing data of the second terminal to the first terminal comprises:

when receiving data that is of a webpage identified by the first webpage identity and sent by the first terminal, forwarding the data sent by the first terminal to the second terminal; and when receiving data that is of a webpage identified by the second webpage identity and sent by the second terminal, forwarding the data sent by the second terminal to the first terminal.

3. The method according to claim 1, wherein the step of sharing data of the first terminal to the second terminal, and sharing data of the second terminal to the first terminal comprises:

when receiving operation instruction data from the first terminal and for a webpage identified by the first webpage identity, forwarding, to the second terminal, the operation instruction data sent by the first terminal, so that the second terminal performs, according to the operation instruction data sent by the first terminal, a synchronous operation on a webpage identified by the second webpage identity; and when receiving operation instruction data from the second terminal and for the webpage identified by the second webpage identity, forwarding, to the first terminal, the operation instruction data sent by the second terminal, so that the first terminal performs, according to the operation instruction data sent by the second terminal, a synchronous operation on the webpage identified by the first webpage identity.

4. The method according to claim 1, further comprising: according to a close operation of the first terminal to the webpage identified by the first webpage identity, disconnecting the long connection of communications with the first terminal; and according to a close operation of the second terminal to the webpage identified by the second webpage identity, disconnecting the long connection of communications with the second terminal.

5. A server for data sharing, comprising:

one or more processors; and a memory storing computer-executable codes executable at the one or more processors, wherein the codes comprise:

a connection establishing module, configured to establish, according to a first webpage request of a first terminal, a long connection of communications with the first terminal, and establish, according to a second webpage request of a second terminal, a long connection of communications with the second terminal, wherein the first webpage request carries a first webpage identity, and the second webpage request carries a second webpage identity;

a determining module, configured to determine, according to the first webpage identity and the second webpage identity, whether the first terminal and the second terminal are shared terminals; and a data sharing module, configured to, if the first terminal and the second terminal are shared terminals, share data of the first terminal to the second terminal, and share data of the second terminal to the first terminal, wherein the determining module comprises:

a first determining unit and a first result determining unit, wherein the first determining unit is configured to determine whether the first webpage identity and the second webpage identity identify a same webpage, and whether the first webpage identity and the second webpage identity contain the same encrypted field, and the first result determining unit, configured to, if the first webpage identity and the second webpage identity identify the same webpage, and the first webpage identity and the second webpage identity contain the same encrypted field, determine that the first terminal and the second terminal are shared terminals; or a second determining unit and a second result determining unit, wherein the second determining unit, configured to, if the first webpage identity and the second webpage identity are encrypted identities, determine whether encryption keys of the first webpage identity and the second webpage identity are the same, and whether the first webpage identity and the second webpage identity identify a same webpage, and the second result determining unit, configured to, if the encryption keys of the first webpage identity and the second webpage identity are the same, and the first webpage identity and the second webpage identity identify the same webpage, determine that the first terminal and the second terminal are shared terminals.

6. The server according to claim 5, wherein the data sharing module comprises:

a first webpage data sharing unit, configured to, when receiving data that is of a webpage identified by the first webpage identity and sent by the first terminal, forward the data sent by the first terminal to the second terminal; and a second webpage data sharing unit, configured to, when receiving data that is of a webpage identified by the second webpage identity and sent by the second terminal, forward the data sent by the second terminal to the first terminal.

7. The server according to claim 5, wherein the data sharing module comprises:
  a first instruction data sharing unit, configured to, when receiving operation instruction data from the first terminal and for a webpage identified by the first webpage identity, forward, to the second terminal, the operation instruction data sent by the first terminal, so that the second terminal performs, according to the operation instruction data sent by the first terminal, a synchronous operation on a webpage identified by the second webpage identity; and
  a second instruction data sharing unit, configured to, when receiving operation instruction data from the second terminal and for the webpage identified by the second webpage identity, forward, to the first terminal, the operation instruction data sent by the second terminal, so that the first terminal performs, according to the operation instruction data sent by the second terminal, a synchronous operation on the webpage identified by the first webpage identity.

8. The server according to claim 5, the codes further comprising:
  a connection disconnecting module, configured to, according to a close operation of the first terminal to the webpage identified by the first webpage identity, disconnect the long connection of communications with the first terminal; and according to a close operation of the second terminal to the webpage identified by the second webpage identity, disconnect the long connection of communications with the second terminal.

9. A data sharing system, comprising a first terminal, a second terminal and a server, wherein the server is the server according to claim 5.

10. A non-transitory computer-readable medium storing instructions which, when executed by one or more processors, cause a system to perform a method for data sharing, the method comprising:
  establishing, according to a first webpage request of a first terminal, a long connection of communications with the first terminal, wherein the first webpage request carries a first webpage identity;
  establishing, according to a second webpage request of a second terminal, a long connection of communications with the second terminal, wherein the second webpage request carries a second webpage identity;
  determining, according to the first webpage identity and the second webpage identity, whether the first terminal and the second terminal are shared terminals; and
  if the first terminal and the second terminal are the shared terminals, sharing data of the first terminal to the second terminal, and sharing data of the second terminal to the first terminal.
  wherein the step of determining, according to the first webpage identity and the second webpage identity, whether the first terminal and the second terminal are the shared terminals comprises:
    determining whether the first webpage identity and the second webpage identity identify a same webpage and whether the first webpage identity and the second webpage identity contain a same encrypted field, and if the first webpage identity and the second webpage identity identify the same webpage and the first webpage identity and the second webpage identity contain the same encrypted field, determining that the first terminal and the second terminal are the shared terminals; or
    if the first webpage identity and the second webpage identity are encrypted identities, determining whether encryption keys of the first webpage identity and the second webpage identity are the same and whether the first webpage identity and the second webpage identity identify a same webpage, and if the encryption keys of the first webpage identity and the second webpage identity are the same, and the first webpage identity and the second webpage identity identify the same webpage, determining that the first terminal and the second terminal are the shared terminals.

11. The non-transitory computer-readable medium according to claim 10, wherein the step of sharing data of the first terminal to the second terminal, and sharing data of the second terminal to the first terminal comprises:
  when receiving data that is of a webpage identified by the first webpage identity and sent by the first terminal, forwarding the data sent by the first terminal to the second terminal; and
  when receiving data that is of a webpage identified by the second webpage identity and sent by the second terminal, forwarding the data sent by the second terminal to the first terminal.

12. The non-transitory computer-readable medium according to claim 10, wherein the step of sharing data of the first terminal to the second terminal, and sharing data of the second terminal to the first terminal comprises:
  when receiving operation instruction data from the first terminal and for a webpage identified by the first webpage identity, forwarding, to the second terminal, the operation instruction data sent by the first terminal, so that the second terminal performs, according to the operation instruction data sent by the first terminal, a synchronous operation on a webpage identified by the second webpage identity; and
  when receiving operation instruction data from the second terminal and for the webpage identified by the second webpage identity, forwarding, to the first terminal, the operation instruction data sent by the second terminal, so that the first terminal performs, according to the operation instruction data sent by the second terminal, a synchronous operation on the webpage identified by the first webpage identity.

13. The non-transitory computer-readable medium according to claim 10, the method further comprising:
  according to a close operation of the first terminal to the webpage identified by the first webpage identity, disconnecting the long connection of communications with the first terminal; and
  according to a close operation of the second terminal to the webpage identified by the second webpage identity, disconnecting the long connection of communications with the second terminal.

* * * * *